United States Patent [19]
Palmquist

[11] Patent Number: 4,618,962
[45] Date of Patent: Oct. 21, 1986

[54] FURNACE BOTTOM HEATING

[75] Inventor: Ronald W. Palmquist, Horseheads, N.Y.

[73] Assignee: Corning Glass Works, Corning, N.Y.

[21] Appl. No.: 729,619

[22] Filed: May 2, 1985

[51] Int. Cl.$^4$ ............................................. C03B 5/027
[52] U.S. Cl. ........................................................ 373/30
[58] Field of Search ....................... 373/30, 31, 32, 36, 373/37, 38, 39, 41

[56] References Cited

U.S. PATENT DOCUMENTS 2,119,949  6/1938  Blau et al. .............................. 373/32
2,781,411  2/1967  Geffcken et al. .
3,109,045  10/1963  Silverman .
4,366,571  6/1984  Palmquist .

Primary Examiner—Roy N. Envall, Jr.
Attorney, Agent, or Firm—B. R. Turner

[57] ABSTRACT

Electrically energizable heating means are disclosed for supplying heat to a bottom portion of a melting furnace having a metal lined refractory vessel, wherein the heating means are in the form of electrodes or resistance heaters which are protected from the body of the melt by a shroud forming a portion of the metal liner for the refractory vessel, and such heating elements are raised above the bottom of the refractory vessel to prevent the corrosion thereof due to the heat produced by the heating units.

21 Claims, 16 Drawing Figures

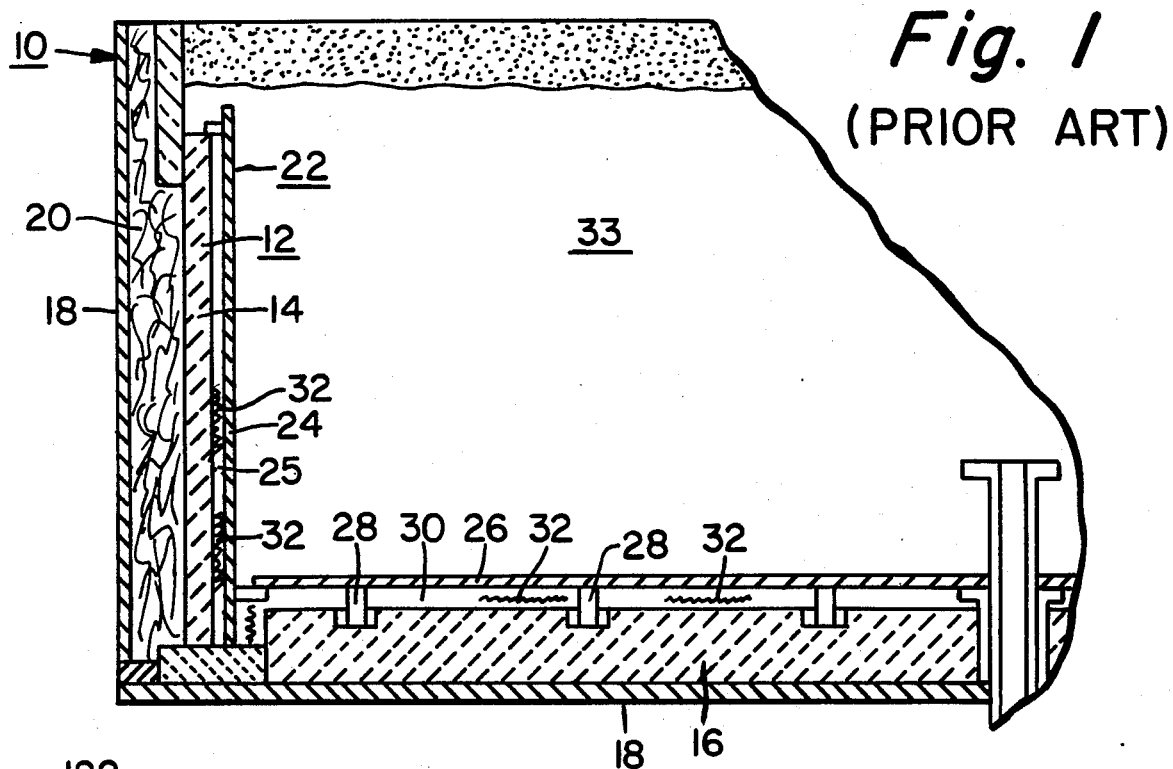
Fig. 1 (PRIOR ART)
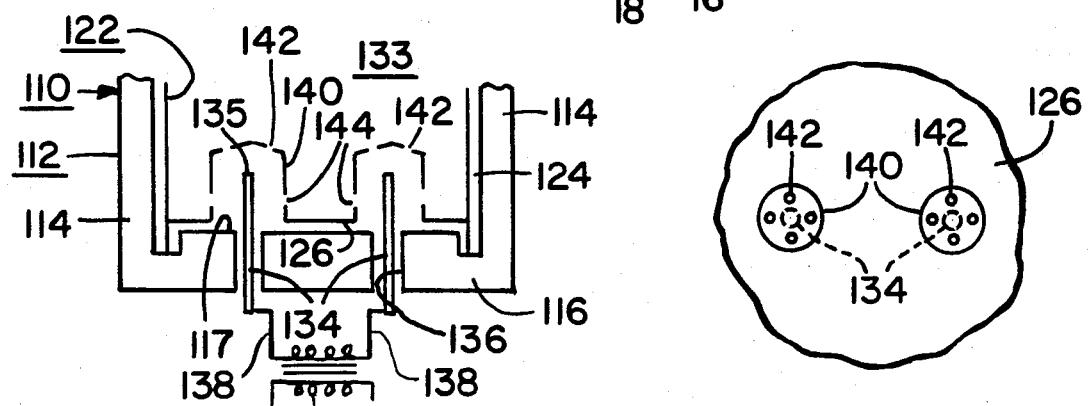
Fig. 2
Fig. 3
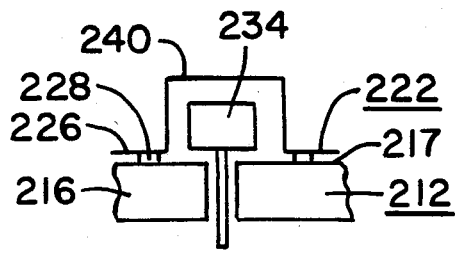
Fig. 4
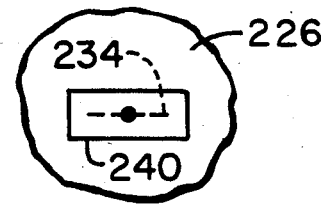
Fig. 5

FURNACE BOTTOM HEATING

BACKGROUND OF THE INVENTION

This invention relates to furnaces for melting thermoplastic materials, such as glass, and more particularly to those furnaces having a protective liner within the melting chamber of the furnace. As pointed out in U.S. Pat. No. 4,366,571, the use of a refractory metal liner materially extends the useful life of a melting furnace by protecting the refractory sidewalls and bottom walls of the melting chamber from the corrosive action of the molten bath contained therein.

In standard refractory glass melting furnaces, bottom electrodes are generally utilized to assist in the start up of the furnace and to maintain the temperature of the melt adjacent the bottom at a desired thermal level. Since the refractory, forming the vessel of a standard furnace, is usually non-conductive and functions as an electric isolator, there has been no difficulty with respect to electrical shorting when immersing electrodes through the lower portion of the sidewalls or up through the bottom walls of the furnace. However, when a furnace is lined with a refractory metal protective liner, wherein a molybdenum or other refractory metal bottom plate overlies the refractory bottom of the furnace, there is no possibility of immersing the electrodes through the molybdenum lining, since such lining would short circuit the electrical supply to the electrodes.

In view of the fact that it is not feasible to immerse electrodes up through the bottom of a furnace having a protective metal liner, it became necessary to supply bottom heat to the furnace by positioning resistance heaters in the space between the bottom wall and the bottom liner. As shown in the prior art furnace 10, of FIG. 1, a plurality of resistance heaters 32 are positioned within the limited space provided between the protective liner and the refractory walls of the vessel. That is, the furnace 10 includes a refractory vessel 12 having upstanding sidewall portions 14 and a bottom wall portion 16. The refractory vessel 12 is surrounded by an outer shell 18 and may have insulation 20 therebetween.

A refractory metal liner 22 is positioned within the vessel 12 in closely spaced-apart relationship therewith such that the sidewall portions 24 of the liner are spaced-apart from the upstanding portions 14 of the refractory vessel with a limited cavity or space 25 therebetween. The bottom wall portion 26 of the liner is spaced-apart from the bottom wall 16 of the refractory vessel by means of spacers 28, forming a cavity or space 30 between the bottom wall 16 of the refractory vessel and the bottom wall 26 of the protective liner. As shown, a plurality of resistance heaters 32 are positioned within the space 25 behind the sidewall 24 of the liner and within the space 30 below the bottom wall 26 of the liner.

The utilization of such resistance heaters has not been completely satisfactory due to installation problems and inefficient operations. The sidewall heaters, for example, are different to install in view of the fact that installation involves the removal of insulation from around the side of the furnace, adding to the complexity and cost of installation. In addition, the gap between the liner and the refractory adjacent the bottom of the vessel is filled with a noncorrosive glass that may have zirconia particles suspended in a silica matrix, and has a very low conductivity. Accordingly, any resistive heater placed behind the liner has a tendency to overheat, since the protective glass is an insulating material.

In a like manner, for the wire mesh resistive heaters 32, lying on top of the bottom refractory wall 16 underneath the bottom plate 26, to transmit energy to molten glass 34 within the vessel 22, the heaters must first transmit energy through a layer of glass or tamp within the space 30 and then through the bottom plate 26 of the liner 22. Accordingly, the temperature of the resistance heater tends to become hotter in order to transmit the energy to the bottom plate, which results in the refractory therebeneath to disassociate or becomes soft, thus leading to the failure of the resistance heater. To restate the problem, the high temperature of the resistance heater softens the refractory bottom wall 16, upon which it is resting, so that the resistance heater 32 tends to sink into the bottom refractory and finally breaks or burns out due to its high temperature.

In U.S. Pat. No. 2,781,411, molten glass within a crucible may be provided with Joule heating by means of electrodes positioned within the crucible or by utilizing the crucible per se as an electrode. In addition, a resistance heater in the form of a heating spiral, may be positioned externally of the crucible for supplementing the heat supplied by the electrodes.

In U.S. Pat. No. 3,109,045, the melting of the glass within the melting pot is accomplished through the resistance heating of the pot per se. In addition, molten glass surrounding the pot is heated by electrodes, whose circuits may be completed through the melting pot per se.

The utilization of bottom heaters in furnaces having refractory metal liners is more crucial to the operation of the furnace than in standard refractory furnaces, since metal lined furnaces require that the operating energy be provided by electrodes immersed through a batch blanket which rests upon the surface of the molten bath. Therefore, when there is an interruption in the supply of energy from such electrodes, such as during start-up wherein an initial protective crown is removed from the furnace after a batch blanket is formed, or during a malfunction of the batch electrodes, the bottom heating means would function as the only means to maintain the bath in its molten state, until such time as repairs could be completed.

The present invention overcomes the problems encountered with the known prior art furnaces by providing a system of bottom heaters which is not unduly influenced by the glass mixture beneath the bottom liner, and which more effectively transfers heat to the glass within the molten bath without deleteriously affecting the refractory material adjacent the heater.

SUMMARY OF THE INVENTION

In its simplest form, the present invention relates to the use of bottom heaters in a metal lined refractory melting furnace so as to effectively supply heat to the lower portion of the furnace through the bottom plate of the metal liner, without deleteriously affecting the refractory adjacent the bottom of the furnace. Preferably, the heating unit is positioned upwardly away from the refractory bottom of the furnace, and the bottom liner plate is raised so as to accommodate the heater in the space between the bottom plate and the refractory bottom.

BRIEF DESCRIPTION OF THE DRAWINGS

FIG. 1 is a fragmental schematic elevational view in section of a prior art furnace incorporating bottom heating units between a refractory melting vessel and a protective metal liner therefor.

FIG. 2 is a fragmental schematic elevational view of a lower portion of a furnace, showing heating assemblies embodying the present invention positioned therein.

FIG. 3 is a fragmental top plan view of the embodiment shown in FIG. 2.

FIG. 4 is a fragmental schematic elevational view of a further embodiment of the present invention positioned within the bottom of a furnace.

FIG. 5 is a fragmental top plan view of the embodiment shown in FIG. 4.

DESCRIPTION OF THE PREFERRED EMBODIMENTS

Figure 6:
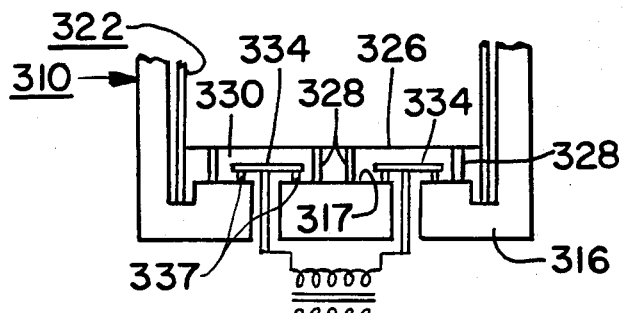
FIG. 6 is a fragmental schematic elevational view illustrating a further embodiment.

Referring now to FIGS. 2 and 3, a furnace 110, having a refractory vessel 112 with upstanding sidewall portions 114 and a bottom wall 116, is shown having a refractory metal liner 122. The liner 122 includes sidewall portions 124 and a bottom plate 126. A plurality of electrodes 134 project through suitably insulated openings 136 in bottom wall 116 and extend above the upper inner surface 117 of the bottom wall. Suitable electrical leads 138 from a transformer T are provided for energizing the electrodes 134.

As shown in FIGS. 2 and 3, the bottom plate 126 is provided with a can or shroud portion 140 which extends over and accommodates each of the electrodes 134. The electrodes may be in the form of typical 2" diameter molybdenum rod bottom electrodes, which extend through the bottom of the furnace with suitable refractory thereabout to prevent leakage. Each electrode essentially fires through the glass or tamp material contained within the can or shroud 140 to the can per se, and then through the metal bottom plate 126 to the next can 140. The glass or tamp material which is retained inside the can adjacent the electrode is heated by Joule heating, and the energy is transmitted through the walls of the can into the molten glass bath 133 retained within the liner 122. In view of the fact that the operating end 135 of the electrodes 134 is elevated and positioned away from the surface 117 of the refractory bottom wall 116, and further in view of the fact that the heat from the electrodes tends to rise within the furnace, there is a minimal heating of the bottom refractory 116, thus reducing its deterioration. Hence, the life of bottom electrodes 134 is substantially greater than the resistance heaters 32 of the prior art.

In order for the electrode heaters 134 to function efficiently, it is necessary that the bottom plate 126 of the liner connecting adjacent shrouds or cans 140 be continuous and a good electrical conductor, so as to avoid the occurrence of hot spots. Further, it is necessary to vent any gases, which may be generated within the cans 140 during the firing cycle, by means of vent openings 142 formed in the top of the cans. In addition inlet openings 144, adjacent the bottom of the cans or shrouds 140, allow molten glass to enter the chamber formed by the cans. If desired, larger diameter rod electrodes may be utilized, or the electrodes may be provided with larger heads on their operating ends 135 so as to reduce current density. For example, a 4" diameter head may be formed on the operating end 135 of a 2" diameter electrode rod 134.

As shown in FIGS. 4 and 5, the rod electrode may be replaced with a plate electrode 234, which is retained on a suitable support or lead 237 extending through the bottom refractory wall 216 of the refractory vessel 212. The bottom plate 226 of the refractory metal liner may be provided with suitable supports or spacers 228 to space the bottom plate from the upper surface 217 of the bottom wall 216. A rectangular shroud or can 240 surrounds the plate electrode 234. The combination of the plate electrode 234 and the rectangular can 240 provides increased surface area for heat dissipation into the molten glass bath contained within the liner 220, and results in a more efficient utilization of the electrode surface area. The embodiment of FIGS. 4 and 5 has particular application where high rates of power are required, or where low resistivity glasses are to be melted.

Although the shrouded electrode 234 will create high temperatures similar to the horizontal mesh heater of the prior art, because of its vertical orientation, the higher temperatures occur well above the refractory bottom surface 217, and accordingly such temperatures do not have a tendency to soften the refractory bottom or result in the distruction of the heating element, such as occurred in the prior art.

Figure 7:
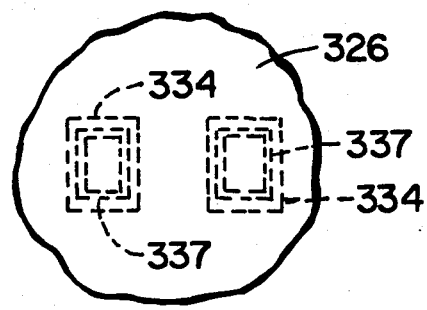
FIG. 7 is a fragmental top plan view of the embodiment shown in FIG. 6.

Referring now to FIGS. 6 and 7, another embodiment for providing power into the bottom of a melting furnace 310 is shown in the form of plate electrodes 334 positioned horizontally beneath the bottom plate 326 of liner 322. The bottom plate 326 may be sufficiently elevated above the inner surface 317 of bottom wall 316 by means of suitable spacers 328, so as to provide adequate room for the horizontal plate electrodes 334 within the space 330 between the bottom wall and the bottom plate. Also, the plate electrode itself may be raised above the surface 317 of the bottom wall 316 by means of supports 337 to minimize the heating effect produced by the electrode on the bottom wall 316.

The horizontal bottom electrode configuration may be made inexpensively in view of the fact that ¼" molybdenum plate functions very satisfactorily. An advantage of such a bottom plate electrode resides in the fact that large areas of the molybdenum bottom plate 326 may be heated by the plate electrode 334 to provide a uniform broad base heating effect which will have a minimal affect on convection currents in the melter. Further, the use of a large area functions to reduce the maximum temperature attained thereby, thus contributing to uniformity. Furthermore, Joule heating by the horizontal plate electrode dissipates the energy in the volume of glass or tamp within the space 330 between the electrode 334 and the bottom plate 326, whereas a resistive heater of the prior art dissipates the energy entirely within the mesh of the heater. Thus, in practical terms, the temperature difference required for driving the necessary energy through the bottom plate 326 to the molten bath through the use of the horizontal plate electrode 334, is approximately ½ of that required by a resistance mesh heater of the prior art.

Figure 8:
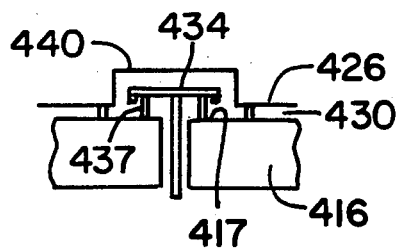
FIG. 8 is a fragmental schematic elevational view of a further embodiment.
Figure 9:
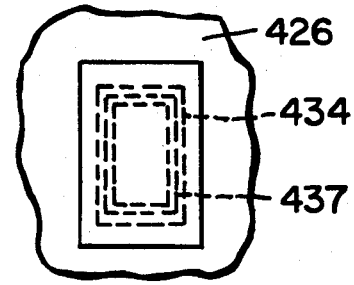
FIG. 9 is a fragmental top plan view of the embodiment shown in FIG. 8.

A variation of the shrouded horizontal electrode plate of FIGS. 6 and 7, is shown in FIGS. 8 and 9. In the embodiment shown in FIGS. 8 and 9, however, the bottom plate 426 of the liner is raised in the form of a can or shroud 440 in the area of the plate electrode 434. Thus, the plate electrode 434 may be elevated away from the upper surface 417 of the refractory bottom wall 416 by means of suitable supports 437. Such construction eliminates the expense of a support structure for elevating the entire bottom plate 3 or 4 inches above the refractory bottom 416 such as 326, and minimizes the circulation of glass contained within the space 430 beneath the bottom plate 426. Thus, the shrouded bottom plate electrode 434 of FIGS. 8 and 9 allows the energy generated by the plate electrode to be elevated away from the refractory bottom 416, while maintaining the majority of the bottom plate 426 in close proximity to such refractory bottom to minimize the circulation of glass within the space 430 and thereby reduce the corrosion of the refractory bottom.

Figure 10:
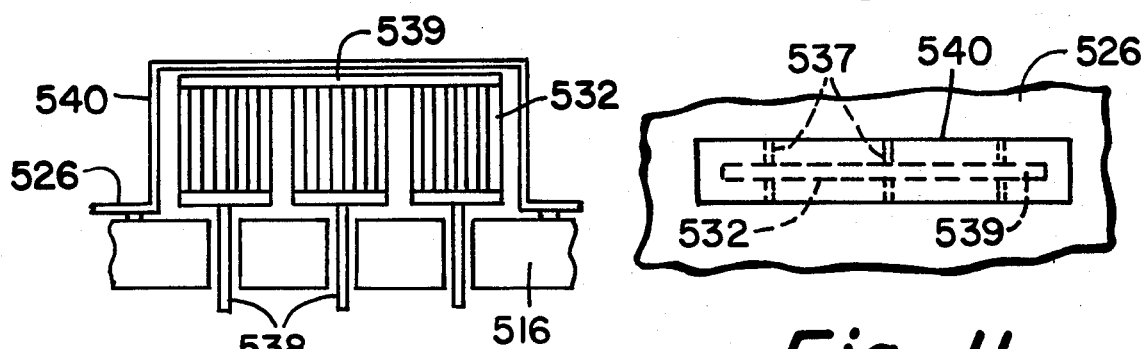
FIG. 10 is a fragmental schematic elevational view of a further embodiment.
Figure 11:
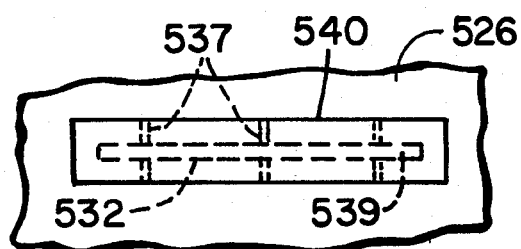
FIG. 11 is a fragmental top plan view of the embodiment shown in FIG. 10.

As shown in FIGS. 10–13, resistance heaters may be positioned vertically within a shroud to provide the necessary energy to the bottom portion of the molten bath within the furnace, without being in close contact with the bottom refractory. That is, the vertically oriented three phase heater 532 of FIGS. 10 and 11 is shown positioned linearly along a bottom portion 516 of the furnace. A bottom plate 526 is provided with an elevated rectangular shroud or can 540 enclosing the vertical three phase resistance heater 532. The top of the heater is preferably provided with a plurality of supports 537 which extend between the heater 532 and sidewalls of the can 540, to give lateral support to the heater and prevent if from falling over. In view of the fact that only lateral support is required, the supports 537 allow for vertical expansion differences between the heater and the can, due to temperature differences generated during melting operations. A shorting bar 539 connects longitudinally along the linear top portions of the three phases of the heater 532, whereas electrical leads 538 are attached to bottom portions of the heater sections. Although other heater constructions may be utilized, a three phase heater is deemed to be the most efficient form of a heater since it will still operate even if one heating element fails. Further, although a mesh heater has the advantage of facilitating thermal expansion during the heat up and cool down phases of its operation, the mesh material has little strength in compression, and accordingly it would be preferable to use a resistance heater composed of vertical rods or strips which are self supporting in compression.

Figure 12:
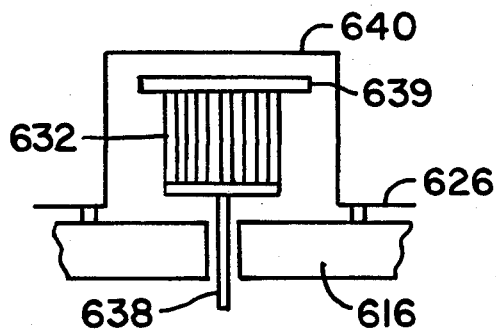
FIG. 12 is a fragmental schematic elevational view of a further embodiment.
Figure 13:
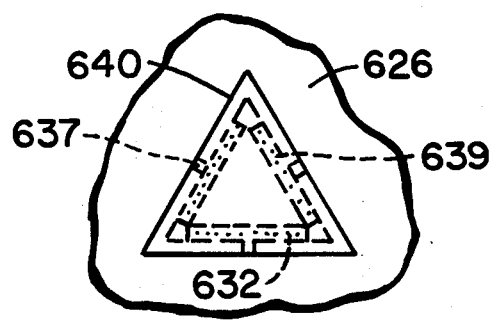
FIG. 13 is a fragmental top plan view of the embodiment shown in FIG. 12.

The embodiment shown in FIGS. 12 and 13 is similar to that shown in FIGS. 10 and 11, except for the fact that the three phase heater 632 is shown with the three phases supported in a triangular fashion (see particularly FIG. 13). The three phase resistance heater 632 has a shorting bar 639 at the top connecting the three phase sections, and electrical leads 638 at the bottom. Suitable supports 637 position the heater phases from sidewalls of the shroud or can 640, which is in a triangular shape to accomodate the heater. Although the three phase heater 532 of FIGS. 10 and 11 will allow maximum surface area for the dissipation of heat, the triangular configuration of resistance heater 632 affords greater stability.

The vertical resistance heaters of FIGS. 10–13 have the advantage that the heat generated by the heater is dissipated in a heating element which is elevated above the bottom refractory 516, 616, and accordingly minimal energy is dissipated near the refractory itself. The electrical leads 538, 638 which pass through the bottom refractory 515, 616 create little Joule heating because of their low voltage difference. Thus, by raising the bottom plate sufficiently high to accomodate a vertical resistance heater, such heaters may be utilized without encountering the problems of the horizontal prior art resistance heaters.

Figure 14:
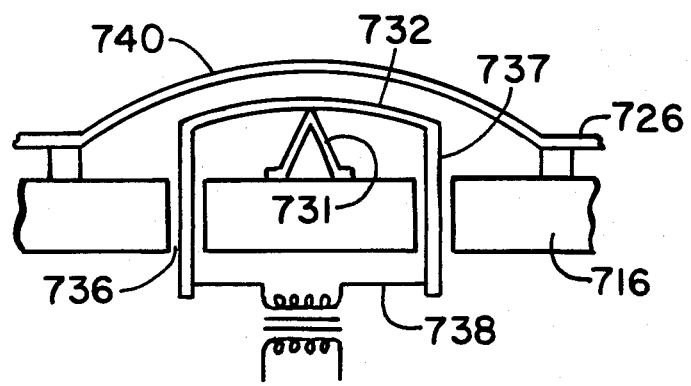
FIG. 14, FIG. 15 and FIG. 16 are fragmental schematic elevational views of further embodiments of the present invention.

A resistance heater is shown in FIG. 14 which is design to be self-supporting, in that it can sustain its own weight above the bottom refractory. That is, resistance heater 732, which may be made from strips or plates of molybdenum or tungsten, is in the form of an arch and supported at each end by support members 737 which extend upwardly through an opening 736 in the bottom refractory 716. Bottom plate 726 may be formed with a suitable arched shroud 740 to accomodate the heater 732. Electrical connections 738 are provided to the heater 732 by means of supports 737 extending through suitably insulated openings 736. In view of the fact that the arched geometry of the heater 732 compensates for bending streses, it is capable of supporting its own weight. That is, the thermal expansion of the heater is taken up by the flexing of the arch during the heat up and cool down of the heater. Being horizontal, the resistance heater 732 can provide a very uniform heating of the bottom plate 726, with minimum disruption to convection currents in the melting furnace. If desired, suitable supports 731 may be provided centrally of the end portions of the heater 732, although such parts are generally not deemed to be necessary.

Figure 15:
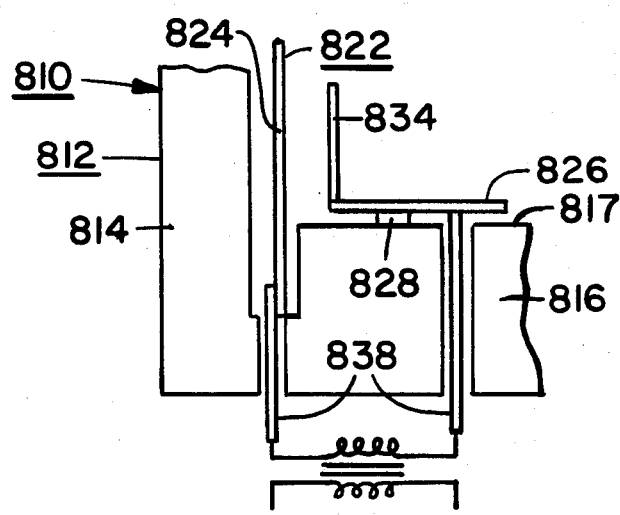

A further embodiment of the present invention is shown in the furnace 810 of FIG. 15. The furnace 810 includes a refractory vessel 812 having upstanding sidewall portions 814 and a bottom wall 816. A refractory metal liner 822 includes a sidewall liner 824 and a bottom plate 826, spaced from the upper inner surface 817 of the bottom wall 816 by means of spacers 828. A ring electrode 834 extends upwardly from edge portions of the bottom plate 826 adjacent a bottom portion of the sidewall liner 824. Electrical connections 838 are made to both the sidewall liner 824 and the bottom plate 826.

The circular ring electrode 834, secured to the bottom plate 826, fires directly to a bottom portion of the sidewall liner 824. The fact that electrical connections are required directly to the liner and the bottom plate does present a slight disadvantage. However, the design does produce uniform power into the relatively cold bottom corner of the melter. Further, refractory corrosion between the ring electrode and the wall liner is held to a minimum due to the fact that the natural temperature gradients tend to minimize the Joule heating effect near the bottom of the slot in which the wall liner is positioned. Further, because of the relatively large electrode surface area which is presented between the ring electrode 834 and the bottom portion of the wall liner 824, both current density and power density may be relatively low. Also, due to the close spacing of the electrode elements, no special shrouds or supports are needed for the electrodes.

Figure 16:
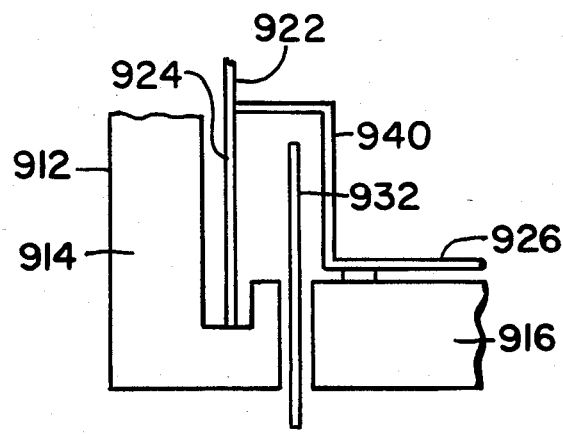

Finally, FIG. 16 illustrates the utilization of a vertical resistance heater or electrode 932 positioned circumferentially about the lower corner of the melter adjacent a lower portion of the wall liner 924. That is, refractory vessel 912, having upstanding sidewall portions 914 and a bottom wall portion 916 is provided with a refractory liner 922 having a sidewall 924 and a bottom plate 926. A shroud 940, formed as a portion of the bottom plate 926, extends over the resistance heater or electrode 932 and joins the sidewall 924 to protect the heater. Thus, the resistance heater or electrode 932 provides bottom energy of very uniform power to the coldest portion of the bottom and is inexpensive to fabricate in view of the fact that the liner itself serves as a part of the shroud 940.

Although, as shown in the foregoing examples, it is possible to utilize either a resistance heater or electrode heating to supply the necessary heat to the bottom portion of a metal-lined refractory melting furnace, the resistance heaters have an advantage that they can operate even if the glass is cold, whereas an electrode can only operate after the glass is conductive (i.e. about 700° C.). Further, a resistance heater, such as the supported heater shown in FIG. 14, could operate as a plate electrode, such as shown in FIGS. 6-8, once the glass has been heated to its conductive state.

As previously mentioned, the shape and configuration of the electrodes may be varied widely while still performing satisfactorily. Although the rod electrode of FIGS. 2 and 3 is easy to install, the broad and flat plate electrodes, in either a vertical or horizontal application, are preferred when uniformity in heating is required. As previously mentioned, a rod electrode could be utilized with a head attached thereto to provide greater uniformity, or the rod itself could be positioned horizontally so as to fire to a shroud.

The use of a cover on a shroud about an electrode tends to minimize the circulation of the glass inside the shroud with respect to the glass contained within the liner outside of the shroud, and thereby minimizes the corrosion of the bottom refractory. However, it may not be necessary to apply a cover on a shroud if there is no plan to use the bottom electrodes continuously, since the amount of refractory corrosion would be small, and the cover would not be necessary since the glass inside the shroud would remain stagnant when the electrodes are not fired.

The resistive heating elements may be in the form of rods, flat strips or mesh, and the heating elements may take a variety of shapes. However, the key to the efficient utilization of any resistive heating element resides in maintaining the heating element in a position which is below the metal bottom plate but spaced from the bottom refractory of the vessel. Thus, the metal bottom plate protects the heater from the convection currents of the main body of the molten bath and creates a quiescent stagnant zone therebeneath within which the heater is operative. The heater is positioned sufficiently above the refractory bottom so that the heat therefrom does not cause the refractory to dissasociate or become soft.

Although the now preferred embodiments of the invention have been set forth, it will be apparent to those skilled in the art that various changes and modifications may be made thereto without departing from the spirit and scope thereof as defined in the appended claims.

I claim:

1. A melting furnace comprising:
    a refractory vessel, a molten bath retained therein,
    a metal liner having sidewall portions and a bottom plate positioned within said refractory vessel and spaced-apart from inner surface portions thereof,
    electrically energizable heating means for supplying heat to a lower portion of said melting furnace positioned within a space between said bottom plate and a bottom wall of said refractory vessel,
    molten bath-like material within said space between said bottom plate and said bottom wall,
    said heating means being spaced-apart from the bottom wall of said refractory vessel,
    and said bottom plate having raised portions
    which receive said heating means positioned within the space formed between said bottom plate and the bottom wall of said refractory vessel.

2. A melting furnace as defined in claim 1 wherein said electrically energizable heating means includes a plurality of laterally spaced-apart electrodes, said raised portions of said bottom plate being in the form of a shroud surrounding each of said electrodes, each said shroud being formed integrally with and electrically connected to said bottom plate, and means for firing each said through said molten bath-like material to its respective surrounding shroud for supplying heat to the lower portion of said melting furnace.

3. A melting furnace as defined in claim 2 wherein said laterally spaced-apart electrodes are in the form of electrode rods positioned upwardly through the bottom wall of said refractory vessel, said shrouds being in the form of a cylindrical can about each said vertically oriented electrode rod, and an upper operating end of each said rod being elevated above the bottom wall of said refractory vessel to minimize the heating effect thereon produced upon the firing of the rod to its surrounding can.

4. A melting furnace as defined in claim 2 wherein each said shroud is provided with open portions adjacent its lower extent for permitting the ingress of the molten bath contained within the furnace within the space between the bottom plate and the bottom wall, and each said shroud also having means adjacent its upper extent for permitting the escape therefrom of gas generated during the firing of the electrodes.

5. A melting furnace as defined in claim 2 wherein each said shroud is continuous with said bottom plate and is closed across its upper extent.

6. A melting furnace as defined in claim 2 wherein said electrodes are in the form of electrode plates positioned within the space formed between the bottom plate and the bottom wall of said refractory vessel and elevated above said bottom wall, and said shrouds being in the form of a rectangular can about each said plate electrode.

7. A melting furnace as defined in claim 6 wherein each of said plate electrodes is positioned vertically within its surrounding rectangular can, and the remainder of said bottom plate is positioned adjacent to but slightly spaced apart from said bottom wall.

8. A melting furnace as defined in claim 6 wherein each of said plate electrodes is positioned horizontally within its surrounding rectangular can, each said can having an upper cover surface raised above the remainder of said bottom plate to accomodate said horizontal plate electrode, and means for firing said plate electrode from an upper surface thereof through the molten bath-like material retained within the can to said upper cover surface for supplying heat to a lower portion of the molten bath retained within said refractory vessel.

9. A melting furnace as defined in claim 1 wherein said electrically energizably heating means includes a plurality of vertically positioned resistance heaters, said raised portions of said bottom plate being in a form of a shroud surrounding and overlying each of said resistance heaters, and operable portions of said vertically oriented resistance heaters being elevated within said raised portions above remaining portions of said bottom plate so as to minimize the heating effect on the bottom wall of said refractory vessel produced during the energization of said heaters.

10. A melting furnace as defined in claim 9 wherein each of said vertically positioned resistance heaters includes a three phase heater wherein the elements forming the three phases are linearly aligned and connected together by a shorting bar, and said shrouds being in the form of a rectangular can about each said vertically oriented three phase resistance heater, and support means for maintaining the vertical orientation of said resistance heaters while permitting the vertical expansion thereof due to temperature variations.

11. A melting furnace as defined in claim 9 wherein each of said resistance heaters includes a three phase heater wherein the elements forming the three phases are oriented in a triangle and connected together by a shorting bar, and said shrouds being in the form of a triangular can about each of said triangularly oriented vertical three phase resistance heaters.

12. A melting furnace as defined in claim 1 wherein said heating means includes a plurality of horizontally positioned arcuate resistance heaters, said arcuate heaters being mounted at opposite ends above said bottom wall and being bowed upwardly in the form of an arch centrally of said mounting, said raised portions of said bottom plate being in the form of an arcuate shroud overlying each of said arcuate resistance heaters, and said central arch being above remaining portions of said bottom plate.

13. A melting furnace as defined in claim 1 wherein said heating means includes vertically oriented resistance heater means positioned adjacent said sidewall portions in the said metal liner, said raised portions of said bottom plate being in the form of a shroud surrounding inner and upper portions of said resistance heater means and connecting said bottom plate with said sidewall portions of said metal liner above said resistance heater means, and operable portions of said vertically oriented resistance heater means being elevated within said shroud above the bottom wall of said refractory vessel and above the remainder of said bottom plate to minimize the heating effects on said bottom wall produced during the energization of said heating means.

14. A melting furnace as defined in claim 1 wherein said heating means includes vertically oriented electrode means positioned adjacent said sidewall portions in the said metal liner, said raised portions of said bottom plate being in the form of a shroud surrounding inner and upper portions of said electrode means and connecting said bottom plate and said sidewall portions of said metal liner, means for firing said electrode through said molten bath-like material to said shroud, and said vertically oriented electrode means being elevated above the bottom wall of said refractory vessel to minimize the heating effects thereon produced during the firing of said electrode means.

15. In a melting furnace having a refractory melting vessel provided with a metal liner, means for supplying heat to a bottom portion of said melting furnace and a molten bath retained in the metal liner which comprises:
said metal liner including a sidewall portion positioned adjacent to but spaced-apart from sidewall portions of said refractory melting vessel, and bottom plate means overlying and spaced-apart from a bottom wall of said refractory vessel,
molten bath-like material within the space between said bottom plate and the bottom wall of said refractory vessel,
said means for supplying heat to a bottom portion of said melting furnace including electrically energizable heating means positioned within the space formed between the bottom wall of said refractory vessel and said spaced-apart bottom plate means for transferring heat through said bath-like material and said bottom plate to the molten bath,
means for mounting said heating means within said space such that an operative portion of said heating means is elevated away from the refractory bottom of said vessel to protect the same from the heating effects produced during the energizing of said heating means,
and said bottom plate means including raised portions which receive said mounted heating means therewithin and facilitate the heating of a bottom portion of said melting furnace while protecting the refractory bottom portion of said melting vessel from corrosion.

16. Means for supplying heat to a bottom portion of a melting furnace as defined in claim 15 wherein said electrically energizable heating means includes electrode means mounted within said space, said raised portions include can-like portions surrounding each said electrode means and shaped to complement the same, and means for firing said electrode means through said molten bath-like material to said can-like portions for supplying heat to a bottom portion of said melting furnace.

17. Means for supplying heat to a bottom portion of a melting furnace as defined in claim 16 wherein said electrode means are mounted in a vertical orientation with respect to the bottom portion of said refractory vessel, and said can-like portions having openings adjacent said bottom plate means for permitting the ingress of molten bath material from the melting furnace therewithin and open portions adjacent their upper extent for permitting the escape of the gases generated during the firings of the electrodes.

18. Means for supplying heat to a bottom portion of a melting furnace as defined in claim 16 wherein said electrode means are mounted in a horizontal orientation with respect to the bottom portion of said refractory vessel, said mounting means mounting said horizontal electrode means in a position elevated above said bottom plate means, said raised can-like portions surrounding and overlying said horizontal electrode means, and said firing means firing an upper surface of said horizontal electrode means through said molten bath-like material to an overlying cover surface of said can-like portion.

19. Means for supplying heat to a bottom portion of a melting furnace as defined in claim 15 wherein said electrically energizable heating means includes horizontally oriented plate electrodes mounted within said space in an elevated position above the bottom of said refractory vessel, said bottom plate means being raised across its entire extent above the bottom of said refractory vessel and above said elevated horizontally positioned plate electrodes, and means for firing an upper surface of said horizontal plate electrodes through said molten bath-like material to an under surface of said bottom plate means for supplying heat to a bottom portion of said melting furnace.

20. Means for supplying heat to a bottom portion of a melting furnace as defined in claim 15 wherein said electrically energizable heating means includes three-phase resistance heater means positioned vertically within said space, a shorting bar connecting the three phases of said heating means together, said raised portions including a shroud forming a part of said bottom plate means surrounding and overlying said vertically oriented resistance heater means so as to receive the same therein, and means for energizing said resistance heater means to transfer heat through said molten bath-like material and said shroud to sai molten bath retained in said liner.

21. A furnace for melting thermoplastic materials including a refractory melting vessel and a refractory metal liner positioned within said refractory vessel in close proximity to wall portions thereof but spaced apart therefrom, a molten bath of thermoplastic material within said refractory metal liner, said metal liner including a sidewall portion spaced apart from sidewall portions of said refractory vessel and a bottom plate portion spaced apart from a bottom portion of said refractory vessel, electrode means associated with said bottom plate portion and positioned adjacent a lower end portion of the sidewall of said liner, and means for firing said electrode means through a portion of said molten bath to the lower end portion of said liner sidewall for supplying heat to the thermoplastic material within a lower portion of said refractory metal liner.

* * * * *